United States Patent [19]

Varkia et al.

[11] 4,432,502

[45] Feb. 21, 1984

[54] BOBBIN APPARATUS FOR USE IN RADIOSONDES

[75] Inventors: Esa Varkia; Osmo Reittu, both of Espoo, Finland

[73] Assignee: Vaisala Oy, Finland

[21] Appl. No.: 279,512

[22] Filed: Jul. 1, 1981

[30] Foreign Application Priority Data

Jul. 2, 1980 [FI] Finland .................................. 802130

[51] Int. Cl.³ ............................................ B65H 54/68
[52] U.S. Cl. ........................................ 242/50; 242/96; 242/118; 242/222
[58] Field of Search ...................... 242/222, 61, 50, 96, 242/118–118.2; 46/61, 77, 87; 244/155 R, 155 A, 31, 33; 273/58 C, 200 R, 208, 319, 329–332, 414, 413

[56] References Cited

U.S. PATENT DOCUMENTS 2,395,006  2/1946  Leslie ....................................... 206/1
4,262,857  4/1981  Gilbert .......................... 242/84.1 A

FOREIGN PATENT DOCUMENTS 1525230  9/1978  United Kingdom ................ 242/222

Primary Examiner—Leonard D. Christian
Attorney, Agent, or Firm—Steinberg & Raskin

[57] ABSTRACT

Bobbin apparatus for releasing a connecting filament between a radiosonde and the sonde balloon in a controlled manner during the ascent thereof includes a longitudinally extending member adapted to be affixed to the balloon around which the filament is wound and having a transverse dimension which increases in the longitudinal direction from a narrow upper end to a wide lower end thereof. The filament will unwind from the bobbin member during ascent of the balloon causing the bobbin member to periodically oscillate in a manner such that the filament will unwind without fouling and at an appropriate rate.

9 Claims, 6 Drawing Figures

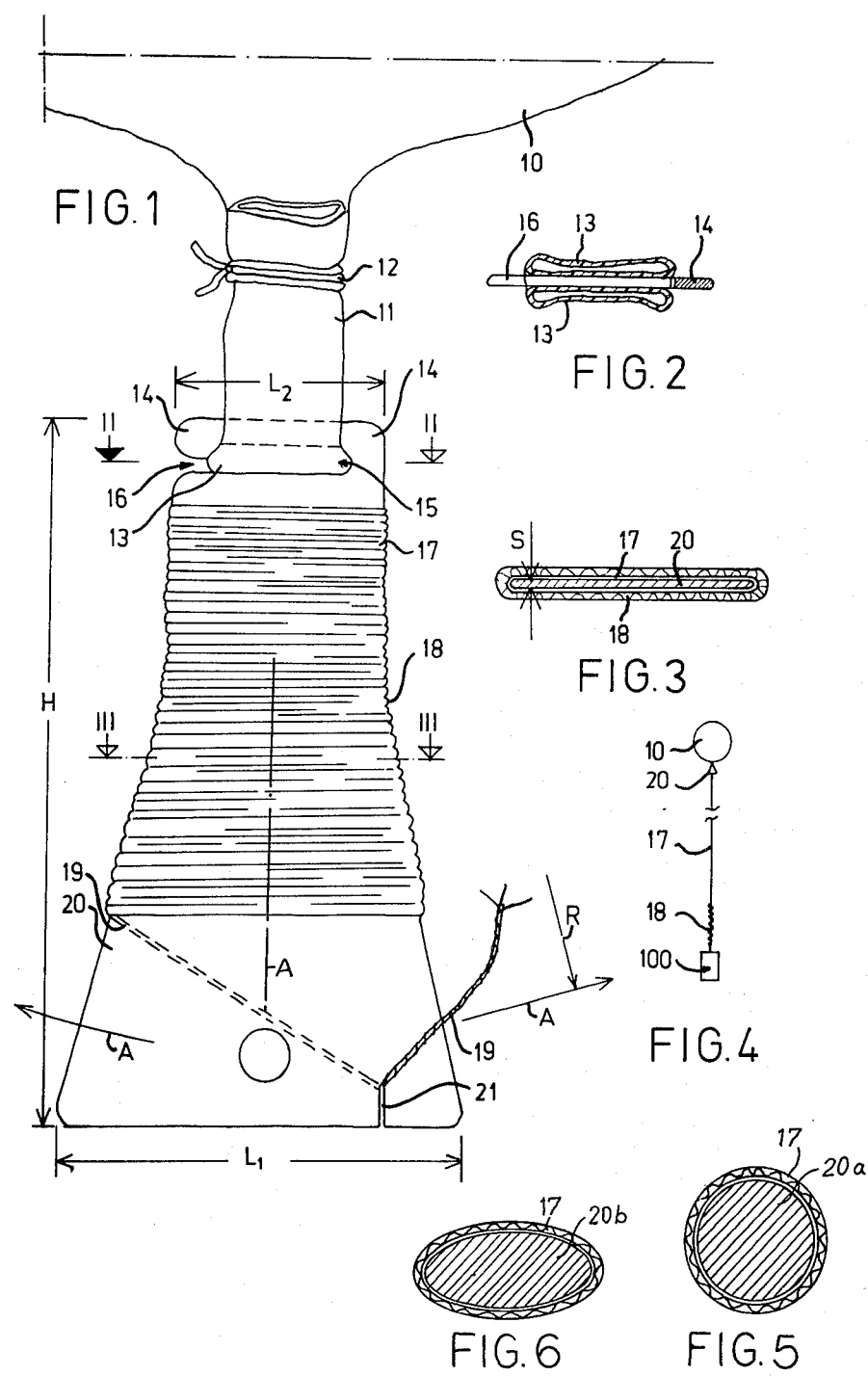

BOBBIN APPARATUS FOR USE IN RADIOSONDES

BACKGROUND OF THE INVENTION

The present invention relates, generally, to radiosondes and, more particularly, to bobbin apparatus for releasing or paying out a filament which interconnects a radiosonde and a sonde balloon in a controlled manner during the ascent of the sonde balloon.

Information as to atmospheric conditions such as meteorological conditions, is obtained using radiosondes, namely miniature radio transmitters with instruments attached which are carried by unmanned gas-filled balloons to extremely high elevations.

During their ascent, such sonde balloons tend to leave a wake in their path in which the atmospheric conditions vary from the true ambient conditions to be measured. For this reason, it is common practice to suspend the radiosonde from the balloon by a relatively long filament having a length of, for example, about 50 meters. It is possible in this manner to eliminate the influence of the sonde balloon on the atmospheric conditions being measured.

Since it is necessary for the balloon and associated radiosonde to be released in a manner such that they ascend simultaneously, it is known in the art to employ mechanical apparatus affixed beneath the balloon which permits the filament to be released or payed out from a spool or bobbin affixed beneath the balloon at a controlled rate. Such mechanical apparatus may, for example, constitute a mechanically actuated pendulum or a friction brake.

Conventional mechanical apparatus of the type described above are not entirely satisfactory in that the same have a relatively complicated construction to insure reliability in use and are therefore quite expensive. However, since such apparatus are generally discarded after only a single use, it will be appreciated that conventional bobbin apparatus are less than satisfactory from the cost standpoint.

SUMMARY OF THE INVENTION

Accordingly, the main object of the present invention is to provide new and improved bobbin apparatus adapted to be attached to a sonde balloon for releasing the filament connecting the balloon and the radiosonde in a positive and uniform manner and yet which has a very simple construction.

In accordance with the present invention, this object as well as others are obtained by providing a bobbin member adapted to be affixed to the sonde balloon around the longitudinal axis of which the filament is adapted to be wound and which has a transverse dimension which increases in the longitudinal direction from a narrow upper end to a wide lower end.

In a preferred embodiment, the bobbin comprises a plate member which includes an upper end region having a substantially uniform transverse dimension or width over its length and a lower end region having a transverse dimension which increases substantially linearly over its length. A slot is formed at an upper end region of the bobbin member which is adapted to receive a looped portion of the tube of the sonde balloon in order to affix the bobbin apparatus thereto.

As the balloon ascends, the filament unwinds from the bobbin apparatus which by virtue of its configuration will oscillate periodically below the balloon causing the sonde filament to unwind without fouling and at an appropriate, controlled rate determined by the radius of the oscillations and by the mass of the bobbin member.

DESCRIPTION OF THE DRAWINGS

A more complete appreciation of the present invention and many of the attendant advantages thereof will be readily appreciated as the same becomes better understood by reference to the following detailed description when considered in connection with the accompanying drawings in which:

FIG. 1 is a side elevation view of one embodiment of the bobbin apparatus of the present invention affixed beneath a fragmentarily illustrated sonde balloon and illustrating the sonde filament wound therearound;

FIG. 2 is a section view taken along line II—II of FIG. 1;

FIG. 3 is a section view taken along line III—III of FIG. 1;

FIG. 4 is a schematic view illustrating a radiosonde suspended from a sonde balloon after the filament has become unwound from the bobbin apparatus;

FIG. 5 is a view similar to FIG. 3 illustrating another embodiment of the present invention; and FIG. 6 is a view similar to FIG. 3 in illustrating yet another embodiment of the present invention.

DETAILED DESCRIPTION OF THE PREFERRED EMBODIMENTS

Referring now to the drawings wherein like reference characters designate identical or corresponding parts throughout the several views, and more particularly to the embodiment of the invention illustrated in FIGS. 1–3, the bobbin apparatus of the present invention comprises a plate member 20 adapted to be affixed below a sonde balloon 10 which is filled with a lighter than air gas. In this connection, the inflation tube 11 of the balloon 10 is folded back onto itself and fixed by means of a tie cord 12 to form a closed loop 13 which provides a convenient means for attaching the plate member 20 to the balloon as described below.

The plate member 20 which constitutes a preferred embodiment of the bobbin apparatus has a longitudinal axis A around which the sonde filament 17 is wound and has a transverse dimension which increases in the longitudinal direction from a narrow upper end to a wide lower end. In the embodiment illustrated in FIG. 1, plate member 20 is constituted by an upper end region having a substantially uniform transverse dimension or width over its length and a lower end region having a transverse dimension which increases substantially linearly over its length. The illustration of the plate member 20 of FIG. 1 is shown in substantially full size and, for example, has a length H of about 15 cm, a width $L_1$ at its lower end of about 8 cm, and a width $L_2$ at its upper end of about 4.5 cm. The plate member 20 may be formed of any suitable material such, for example, as plastic, cardboard or the like and its thickness S (FIG. 3) is preferably about 2–2.5 mm so that the plate member 20 is sufficiently rigid in the direction of its thickness dimension.

A transverse slot 15 is formed at the upper end region of the plate member 20 which is adapted to receive the looped portion 13 of the tube 11 of the sonde balloon 10. The slot 15 is partially defined by a yoke-like portion 14 integrally formed with plate member 20. Thus, in order to affix the bobbin apparatus to the balloon, the yoke-like portion 14 is inserted into the loop 13 of balloon tube 11. The mouth 16 of the slot 15 is preferably narrower than the major portion of the slot in order to assure a positive and reliable attachment of the bobbin apparatus to the loop 13 of balloon 10.

The sonde filament 17 together with the antenna wire 18 which forms a continuation thereof is wound around the plate member 20 as shown in FIG. 1. The end 19 of the sonde filament 17 and 18 may be detachably secured in a slit 21 formed in the lower end of the plate member 20 prior to use. It is understood that the end 19 of the filament 17 and 18 is removed from the slit 21 and attached to the radiosonde 100 immediately prior to releasing the sonde balloon.

The operation of the above-described bobbin apparatus will now be described. The free end 19 of the sonde filament 17 and 18 is detached from the slit 21 and connected to the radiosonde 100 which is located immediately beneath the bobbin apparatus 20 whereupon the same is released into the air. The sonde filament 17 and 18 will then begin to unwind from the plate member 20. By virtue of its configuration, the plate member 20 will oscillate below the balloon 10 periodically to and fro in the direction of arrows A—A and with a radius of oscillation R whose center lies in the region of the tube 11 or of the lower part of the balloon 10. By virtue of this oscillation, the sonde filament 17 and 18 will unwind from the plate member 20 without fouling and at an appropriate rate which is controlled by the radius of oscillation R, by the resistance to the oscillatory motion and by the particular mass of the plate member 20. Furthermore, the periodic oscillation of the plate member 20 which occurs as the filament 17 and 18 is unwound or payed out constitutes a damped oscillation whose energy is obtained from the gravity induced increase of the distance between the sonde 100 and the balloon 10. Eventually, the sonde filament 17 and 18 is completely unwound from the bobbin apparatus so that the distance between the balloon 10 and the radiosonde 100 is about 50 m. Of course, the end of the sonde filament 17 has been affixed to the plate member 20 so that as the balloon 10 continues its ascent, the radiosonde 100 is maintained at a constant distance therefrom.

Although the bobbin apparatus of the present invention has been described above as constituting a plate member, i.e., a member having a substantially flat transverse cross-section, it is understood that other embodiments of the bobbin apparatus are possible. For example, referring to FIG. 5, the bobbin apparatus 20a may comprise a member whose transverse cross-section is substantially circular. Alternatively, referring to FIG. 6, the bobbin apparatus 20b may comprise a member whose transverse cross-section is substantially oval or elliptical. In this connection, it is noted that in all cases bobbin apparatus according to the present invention will have a transverse dimension which increases in the longitudinal direction from a narrow upper end to a wide lower end. Moreover, the bobbin apparatus may be affixed beneath the balloon 10 in a manner other than the yoke and slot arrangement 14, 15 and 16 illustrated in FIG. 1. For example, the attachment may be accomplished by means of a cord or other appropriate fixing apparatus. However, it should be noted that in any manner of attachment, it is necessary for the bobbin apparatus to be affixed in a relatively rigid manner to the tube 11 of the balloon 10 so that a suitable resistance to the oscillation of the plate member 20 or the like will be provided so that the sonde filament 17 and 18 will not unwind too rapidly.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. Bobbin apparatus for releasing a filament which interconnects a radiosonde and a sonde balloon in a controlled manner during the ascent thereof, comprising a bobbin member adapted to be affixed to the balloon having a longitudinal axis around which the filament is adapted to be wound and a transverse dimension which increases in the longitudinal direction from a narrow upper end to a wide lower end thereof, said bobbin member having a configuration which causes it to oscillate below said balloon periodically to and fro as said balloon ascends and said filament unwinds from said bobbin member whereby said filament unwinds from said bobbin member in a controlled manner without fouling and at an appropriate rate.

2. Bobbin apparatus as claimed in claim 1, wherein said bobbin member comprises a plate.

3. Bobbin apparatus for releasing a filament which interconnects a radiosonde and a sonde balloon in a controlled manner during the ascent thereof, comprising a bobbin member adapted to be affixed to the balloon having a longitudinal axis around which the filament is adapted to be wound and a transverse dimension which increases in the longitudinal direction from a narrow upper end to a wide lower end thereof, said bobbin member comprising a plate member including an upper end region having a substantially uniform transverse dimension or width over its length and a lower end region having a transverse dimension which increases substantially linearly over its length.

4. Bobbin apparatus as claimed in claim 3, wherein the width of the lower end of the plate member is about 1.5 to 2 times the width of the upper end thereof.

5. Bobbin apparatus as claimed in claim 1, further comprising means situated in the vicinity of said upper end of said bobbin member for affixing said bobbin member to said balloon.

6. Bobbin apparatus for releasing a filament which interconnects a radiosonde and a sonde balloon in a controlled manner during the ascent thereof, comprising
a bobbin member adapted to be affixed to the balloon having a longitudinal axis around which the filament is adapted to be wound and a transverse dimension which increases in the longitudinal direction from a narrow upper end to a wide lower end thereof;
means situated in the vicinity of said upper end of said bobbin member for affixing said bobbin member to said balloon, said means for affixing said bobbin member to said balloon comprising a slot formed in an upper end region of said bobbin member, said slot being adapted to receive a looped portion of the tube of the sonde balloon.

7. Bobbin apparatus as claimed in claim 1, wherein said bobbin member comprises a plate and wherein the thickness of said plate is smaller than the height and width of said plate by at least one order of magnitude.

8. Bobbin apparatus as claimed in claim 1, wherein said bobbin member has in a transverse cross-section a substantially circular configuration.

9. Bobbin apparatus as claimed in claim 1, wherein said bobbin member has in a transverse cross-section a substantially oval configuration.

* * * * *